(12) United States Patent
Kobayashi et al.

(10) Patent No.: US 7,908,049 B2
(45) Date of Patent: Mar. 15, 2011

(54) FUEL CELL VEHICLE

(75) Inventors: Junichi Kobayashi, Wako (JP); Yuji Nagatani, Wako (JP); Chihiro Wake, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 407 days.

(21) Appl. No.: 12/203,598

(22) Filed: Sep. 3, 2008

(65) Prior Publication Data
US 2009/0069963 A1 Mar. 12, 2009

(30) Foreign Application Priority Data
Sep. 6, 2007 (JP) ................. 2007-231346

(51) Int. Cl.
G06F 19/00 (2011.01)
H01M 8/04 (2006.01)
H01M 10/00 (2006.01)
H01M 2/36 (2006.01)

(52) U.S. Cl. .............. 701/22; 429/48; 429/62; 429/72; 429/82; 429/413; 429/414; 429/428; 429/450; 701/36; 701/45; 701/99

(58) Field of Classification Search ............ 429/48, 429/62, 72, 413, 414, 428, 429, 433, 442, 429/450; 701/22
See application file for complete search history.

(56) References Cited

U.S. PATENT DOCUMENTS

| | | | | |
|---|---|---|---|---|
| 5,658,681 A | * | 8/1997 | Sato et al. | 429/412 |
| 5,667,566 A | * | 9/1997 | Flynn et al. | 96/117.5 |
| 5,769,626 A | * | 6/1998 | Hauff et al. | 432/72 |
| 5,798,186 A | * | 8/1998 | Fletcher et al. | 429/429 |
| 6,027,546 A | * | 2/2000 | Kusters et al. | 95/52 |
| 6,329,089 B1 | * | 12/2001 | Roberts et al. | 429/429 |
| 7,122,259 B2 | * | 10/2006 | Takahashi | 429/429 |
| 2001/0014415 A1 | * | 8/2001 | Iio et al. | 429/22 |

(Continued)

FOREIGN PATENT DOCUMENTS

JP 2003-203665 7/2003

(Continued)

OTHER PUBLICATIONS

Japanese Office Action for Application No. 2007-231346, dated Dec. 22, 2009.

*Primary Examiner* — Khoi Tran
*Assistant Examiner* — Dale Moyer
(74) *Attorney, Agent, or Firm* — Nelson Mullins Riley & Scarborough LLP; Anthony A. Laurentano

(57) ABSTRACT

To provide a fuel cell vehicle capable of reducing power consumption during a time of stopping of the vehicle. The fuel cell vehicle includes a scavenging execution determination unit 411 which determines whether or not to carry out scavenging; an ISU 40 including a microcomputer 41 installed on the scavenging execution determination unit 411. The fuel cell vehicle further includes an electrical supply circuit 43, in which, at a time of start-up by an alarm clock 46, the ISU 40 is booted, and in a case in which it is determined by the scavenging execution determination unit 411 that scavenging is to be carried out, the circuit 43 supplies electricity to the relay unit 36; and in a case in which it is determined by the scavenging execution determination unit 411 that scavenging is not to be carried out, it does not supply electricity to the relay unit 36.

1 Claim, 4 Drawing Sheets

U.S. PATENT DOCUMENTS

| | | | |
|---|---|---|---|
| 2001/0028967 A1* | 10/2001 | Roberts et al. | 429/13 |
| 2001/0051290 A1* | 12/2001 | Kashiwagi | 429/9 |
| 2001/0055707 A1* | 12/2001 | Roberts et al. | 429/30 |
| 2002/0001741 A1 | 1/2002 | Kawasumi et al. | 429/20 |
| 2002/0009623 A1* | 1/2002 | St-Pierre et al. | 429/13 |
| 2002/0119357 A1* | 8/2002 | Baldauf et al. | 429/30 |
| 2004/0115495 A1* | 6/2004 | Asai et al. | 429/22 |
| 2005/0189156 A1* | 9/2005 | Osborne et al. | 180/65.3 |
| 2005/0257969 A1* | 11/2005 | Osborne et al. | 180/65.3 |
| 2005/0271918 A1* | 12/2005 | Murakami et al. | 429/22 |
| 2006/0141310 A1* | 6/2006 | Miyata et al. | 429/24 |
| 2007/0054166 A1* | 3/2007 | Ojima et al. | 429/23 |
| 2007/0092771 A1* | 4/2007 | Wake et al. | 429/22 |
| 2008/0044691 A1* | 2/2008 | Wake et al. | 429/13 |
| 2010/0119898 A1* | 5/2010 | Imai | 429/22 |

FOREIGN PATENT DOCUMENTS

| | | |
|---|---|---|
| JP | 2005-302515 | 10/2005 |
| JP | 2006-351407 | 12/2006 |

* cited by examiner

FUEL CELL VEHICLE

This application is based on and claims the benefit of priority from Japanese Patent Application No. 2007-231346, filed on 6 Sep. 2007, the content of which is incorporated herein by reference.

BACKGROUND OF THE INVENTION

1. Field of the Invention

The present invention relates to a fuel cell vehicle. In greater detail, the present invention relates to a fuel cell vehicle having a plurality of startup triggers.

2. Related Art

In recent years, fuel cell vehicles equipped with a fuel cell system as a power source have come to attract attention. A fuel cell system includes, for example, a fuel cell that generates electricity by creating a chemical reaction of a reactant gas, a reactant gas supply device supplies reactant gas through a reactant gas channel to a fuel cell, and a control device that controls this reactant gas supply device.

The fuel cell has, for example, a stack structure in which tens to hundreds of cells are layered. Here, each cell is constituted by a membrane-electrode assembly (MEA) sandwiched by a pair of separators, in which the membrane-electrode assembly is constituted by two electrodes, an anode (positive electrode) and a cathode (negative electrode), and a solid polymer electrolyte membrane sandwiched by these electrodes.

When hydrogen gas is supplied as a reactant gas to the anode of these fuel cells, and air containing oxygen is supplied as a reactant gas to the cathode, electricity is generated by electrochemical reaction. Since what is generated at the time of electricity generation is basically only nonhazardous water, from the perspectives of the effect on the environment and usage efficiency, fuel cells have come to attract attention.

Incidentally, in an interior of a fuel cell during stopping of electricity generation, as mentioned above, there are cases in which water generated during electricity generation, or water generated by condensation, may accumulate. In a state in which water has accumulated in the interior in this way, if the fuel cell is neglected in low-temperature conditions, the interior of the fuel cell may freeze, necessitating a long warm-up time when activating the fuel cell.

Therefore, in Japanese Unexamined Patent Application Publication No. 2003-203665, in order to prevent an interior of a fuel cell from freezing, a fuel cell system is proposed in which, during a period of stopping of electricity generation of a fuel cell, the system scavenges the interior of a fuel cell using air. In the fuel cell system, even during a period of stopping electricity generation, the system is periodically started up. When the system is started up, it detects the ambient air temperature, and in a case in which this ambient air temperature is equal to or below a prescribed temperature, scavenging processing, in which air is circulated in, and water is removed from, the interior of the fuel cell, is performed.

When the fuel cell system disclosed in the Japanese Unexamined Patent Application Publication No. 2003-203665 is equipped in a vehicle as a power source, during a period of stopping of electricity generation, i.e., during stopping of the vehicle, electricity for the purpose of periodically starting up or performing scavenging processing for the fuel cell system is supplied by a battery that is charged during a period of electricity generation, i.e., during driving of the vehicle. Since electricity of the battery is also used when starting electricity generation of the fuel cell, development of a fuel cell vehicle that has an as much as possible lower reduction in the charge capacity of the battery during a time of stopping of a vehicle, as mentioned above, has been desired.

SUMMARY OF THE INVENTION

The present invention has the objective of providing a fuel cell vehicle capable of reducing power consumption at a time of stopping of the vehicle.

The fuel cell vehicle of the present invention (e.g., the fuel cell vehicle 1 described below) includes a fuel cell (e.g., the fuel cell 10 described below); a plurality of electrical equipment (e.g. a motor 4, and an air compressor 6, described below), having at least an air compressor (e.g., the air compressor 6 described below); an electrical storage device (e.g., the battery 3 described below) for storing electricity generated by the fuel cell; a low-level control device (e.g., the ECU 30 described below) for controlling the plurality of electrical equipment; a relay unit (e.g., the relay unit 36 described below) for connecting the low-level control device and the electrical storage device when electricity is supplied; a fuel cell temperature detection means (e.g., the temperature sensor 19 described below) for detecting a temperature of the fuel cell; a scavenging means (e.g., the compressor control unit 32 described below) that is provided to the low-level control device for driving the air compressor, and scavenges an interior of the fuel cell; a high-level control device (e.g., the integrated ECU 40 described below) operating by electricity supplied from the electrical storage device, having a scavenging execution determination means (e.g., the scavenging execution determination unit 411 of the microcomputer 41 described below) for determining, based on a temperature of a fuel cell detected by the fuel cell temperature detection means, whether or not to carry out scavenging by the scavenging means; and a periodic start-up means (e.g., the alarm clock 46 described below) for periodically booting the high-level control device during a period when the vehicle is stopped; and is characterized as having an electrical supply circuit (e.g., the electrical supply circuit 43 described below) in which, at a time of startup by the periodic start-up means, the high-level control device is booted, and in a case in which the scavenging execution determination means determines that scavenging is to be carried out, the circuit supplies electricity to the relay unit, and in a case in which the scavenging execution determination means determines that scavenging is not to be carried out, the circuit does not supply electricity to the relay unit.

According to this invention, during a period in which the vehicle is stopped, by the periodic start-up means, the high-level control device is periodically booted. Then, after the high-level control device has completed booting, by the scavenging execution determination means of the high-level control device, a determination is made as to whether to scavenge or not based on a temperature of the fuel cell.

Here, in a case in which a determination is made by the scavenging execution determination means to carry out scavenging, electricity is supplied to the relay unit, whereby the low-level control unit and the electrical storage device are connected. Then, electricity is supplied to the low-level control device, and by the scavenging means installed on the low-level control device, scavenging of the fuel cell is carried out.

On the other hand, in a case in which a determination is made not to carry out scavenging by the scavenging execution determination means, electricity is not supplied to the relay unit. Thus, electricity is not supplied to the low-level control device.

Therefore, according to the invention, during a period in which the vehicle is stopped, since electricity is only supplied to the low-level control device in a case in which scavenging is to be carried out, compared to a case in which electricity is supplied to the low-level control device at each periodic start-up, it is possible to reduce power consumption during a time when the vehicle is stopped.

In this case, it is preferable that the fuel cell vehicle further includes a driving start-up means (e.g., the ignition switch 8 described below) for initiating booting of the high-level control device when a key-switch installed in the vehicle is operated, in which the electrical supply circuit, in a case of being started up by the driving start-up means, supplies electricity to the relay unit without waiting for boot-up completion of the high-level control device.

According to the invention, when the key-switch is operated, booting of the high-level control device is initiated by the driving start-up means. On the other hand, in a case in which the electrical supply circuit is booted by the driving start-up means, electricity is supplied to the relay unit without waiting for completion of booting of the high-level control device; thus, the electrical storage device and the low-level control device are connected. Then, electricity is supplied to the low-level control device, whereby usage of electrical equipment that is controlled by low-level control device is enabled.

In this way, compared to a case in which the high-level control device is booted by the periodic start-up means, in a case in which the high-level control device is booted by the driving start-up means, it is possible to shorten the time needed for start-up of a vehicle by just the amount of time that is not needed for waiting for completion of booting of the high-level control device.

In this case, it is preferable that the fuel cell vehicle further includes a vehicle stop command means (e.g., the ignition switch 8 described below) for commanding stopping of the vehicle, and a main electrical supply device (e.g., the regulator 45 described below) for supplying electricity to the high-level control device and the electrical supply circuit, in which the high-level control device, in response to commanding of stopping of the vehicle by the stop command means, after sending, to the electrical supply circuit, a command stopping supply of electricity to the relay unit, stops the main electrical supply device.

According to the invention, in response to a command to stop the vehicle, a command to stop supply of electricity to a relay unit is sent to the electrical supply circuit, and after the supply of electricity to the low-level control device is stopped, supply of electricity to the electrical supply circuit by the main electrical supply device is stopped. Thereby, it is possible to prevent the low-level control device or electrical equipment from malfunctioning, for example, by an interruption of supply of electricity to the electrical supply circuit in the middle of carrying out stop-processing of electrical equipment by the low-level control device.

The control method of the fuel cell vehicle of the present invention is a control method for a fuel cell vehicle (e.g., the fuel cell vehicle 1 described below) including: a fuel cell (e.g., the fuel cell 10 described below); a plurality of electrical equipment (e.g. a motor 4, and an air compressor 6, described below), having at least an air compressor (e.g., the air compressor 6 described below); an electrical storage device (e.g., the battery 3 described below) for storing electricity generated by the fuel cell; a low-level control device (e.g., the ECU 30 described below) for controlling the plurality of electrical equipment; a relay unit (e.g., the relay unit 36 described below) for connecting the low-level control device and the electrical storage device when electricity is supplied; a fuel cell temperature detection means (e.g., the temperature sensor 19 described below) for detecting a temperature of the fuel cell; a scavenging means (e.g., the compressor control unit 32 described below), provided to the low-level control device, for driving the air compressor and scavenging an interior of the fuel cell; and a high-level control device (e.g., the integrated ECU 40 described below), operating by electricity supplied from the electrical storage device, and having a scavenging execution determination means (e.g., the scavenging execution determination unit 411 of the microcomputer 41 described below) for determining, based on a temperature of a fuel cell detected at the fuel cell temperature detection means, whether or not to carry out scavenging by the scavenging means; in which the control method of the fuel cell vehicle is characterized as having: a periodic scavenging determination process which, during a period in which the fuel cell vehicle is stopped, periodically boots up the high-level control device, and determines whether or not to carry out scavenging by the scavenging execution determination means; and an electrical supply determination process which, supplies electricity to the relay unit in a case in which it is determined by the scavenging execution determination means that scavenging is to be carried out, and does not supply electricity to the relay unit in a case in which it is determined by the scavenging execution determination means that scavenging is not to be carried out.

The control method of the fuel cell vehicle is a method developed as an invention for the above-described fuel cell vehicle, and achieves an effect identical to the above-described fuel cell vehicle.

According to the fuel cell vehicle of the present invention, during the period when the vehicle is stopped, since electricity is only supplied to the low-level control device in a case in which scavenging is to be carried out, compared to a case in which electricity is supplied to the low-level control device at each periodic start-up, it is possible to reduce power consumption at a time when the vehicle is stopped.

DETAILED DESCRIPTION OF THE INVENTION

Hereinafter, we describe an embodiment of the present invention by referring to figures.

Figure 1:
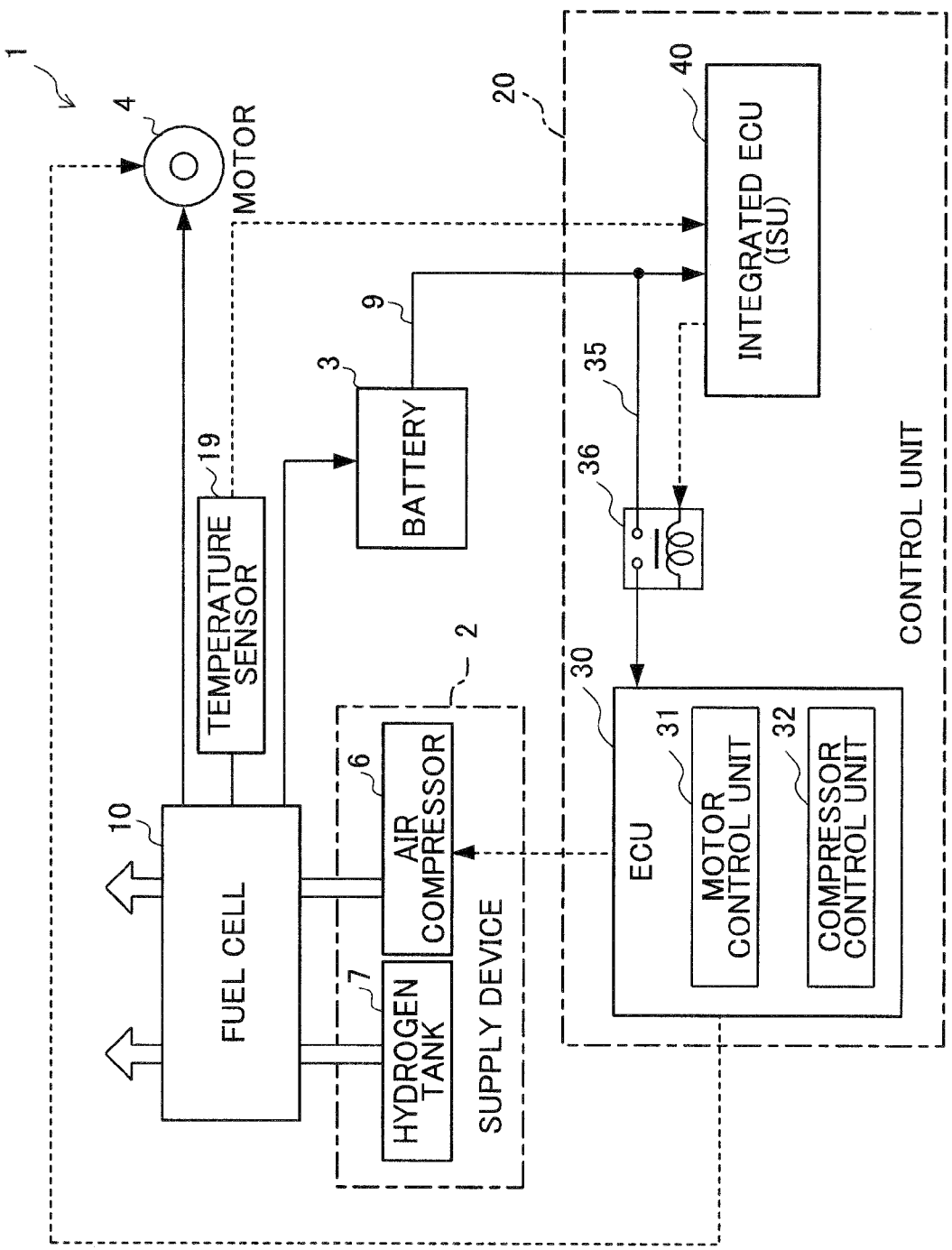
FIG. 1 is a block diagram illustrating a configuration of a fuel cell vehicle related to an embodiment of the present invention.

FIG. 1 is a block diagram depicting a constitution of a fuel cell vehicle 1 related to the embodiment of the present invention.

The fuel cell vehicle 1 includes a motor 4 which drives wheels thereof, a fuel cell 10 which generates electricity by reaction of reactant gases and which supplies electricity to the motor 4, a supply device 2 that supplies hydrogen gas and air to the fuel cell 10, a battery 3 as an electrical storage device which stores electricity generated in the fuel cell 10, and a control unit 20 which controls the above.

When hydrogen gas is supplied to an anode (positive) side, and air including oxygen is supplied to a cathode (negative) side, the fuel cell 10 generates electricity by electrochemical reaction.

The supply device 2 includes an air compressor 6 and a hydrogen tank 7. The air compressor 6 is coupled to the fuel cell 10 through an air supply-pipe (not illustrated), and supplies air to a cathode side of the fuel cell 10. The hydrogen tank 7 is coupled to the fuel cell 10 through a hydrogen supply-pipe (not illustrated), and supplies hydrogen gas to an anode side of the fuel cell 10. Further, the supply device 2 includes, although not illustrated, a humidifier that humidifies air supplied by the air compressor 6, an ejector that circulates hydrogen gas supplied by the hydrogen tank 7, a cooler that cools the fuel cell 10, and the like.

The fuel cell 10 is connected, through an electricity distributor (not illustrated), to the battery 3, the motor 4, and the control unit 20. Electricity generated at the fuel cell 10 is supplied to the battery 3, the motor 4, and the control unit 20. The electricity distributor distributes output from the fuel cell 10 as necessary to the battery 3, the motor 4, and the control unit 20. Further, in the fuel cell 10, a temperature sensor 19 is installed as a fuel cell temperature detection means for detecting a temperature of the fuel cell 10.

The battery 3 stores electricity generated by the fuel cell 10, and in a case in which electricity generation of the fuel cell 10 is stopped, i.e., in a case in which the fuel cell vehicle 1 is stopped, the battery 3 supplies electricity to the control unit 20. The battery 3 is connected to the control unit 20 through an electrical supply line 9.

The control unit 20 includes an integrated ECU (ISU) 40 as a high-level control device, and an ECU 30 as a low-level control device.

The ECU 30 outputs control signals to a plurality of electrical equipment, such as the motor 4, the air compressor 6, and the like, and controls the equipment. More specifically, the ECU 30 includes a motor control unit 31 controlling the motor 4, and a compressor control unit 32 as a scavenging means for controlling the air compressor 6.

The motor control unit 31 outputs control signals to the motor 4 according to a degree that an accelerator pedal (not illustrated) is pressed, and drives the motor 4. The compressor control unit 32 outputs control signals to the air compressor 6, and drives the air compressor 6. Further, this compressor control unit 32, even during stopping of the vehicle 1, drives the air compressor 6 by electricity from the battery 3, and, by supplying new air to the interior of the fuel cell 10, scavenges the interior of the fuel cell 10.

The ECU 30 operates, during a time of driving of the vehicle 1, by supply of electricity from the fuel cell 10. In addition, the ECU 30 is connected to the battery 3 through the electrical supply line 35 that branches off the electrical supply line 9, and when the vehicle 1 is stopped, the ECU 30 operates by electricity supplied from the battery 3.

Moreover, a relay unit 36 that opens and closes the electrical supply line 35 is installed on the electrical supply line 35. The relay unit 36 comprises a mechanical switch and a drive coil that opens and closes this switch. The switch of the relay unit 36 is installed on an electrical supply line 35 connecting the battery 3 and the ECU 30, and the drive coil is connected to the ISU 40.

In other words, in a state in which a relay drive signal for driving the relay unit 36 has been input from the ISU 40, the drive coil is excited and closes the switch, and electricity is supplied from the battery 3 to the ECU 30. Further, in a state in which there is no input of a relay drive signal, supply of electricity from the battery 3 to the ECU 30 is stopped.

The ISU 40 controls the ECU 30 and the relay unit 36. The ISU 40 is connected to the battery 3 through the electrical supply line 9, and operates by supply of electricity from the battery 3.

Figure 2:
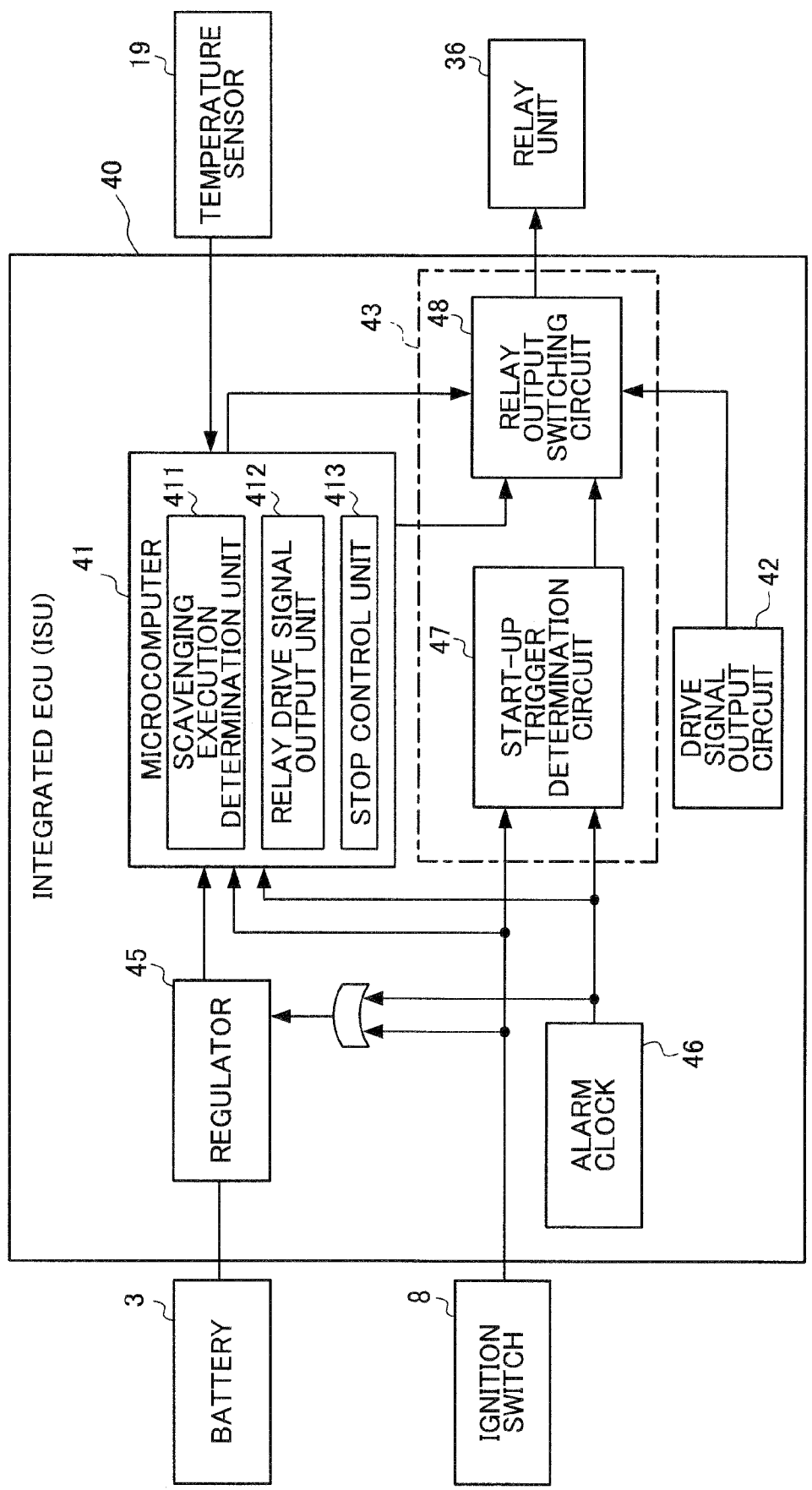
FIG. 2 is a block diagram illustrating a configuration of an ISU related to the embodiment.

FIG. 2 is a block diagram depicting a constitution of the ISU 40.

The ISU 40 includes a microcomputer 41 and a drive signal output circuit 42, which together output relay drive signals for driving the relay unit 36, an electrical supply circuit 43 controlling the relay unit 36 based on input from the microcomputer 41 and the drive signal output circuit 42, and a regulator 45 supplying electricity from the battery 3 to the microcomputer 41.

Further, an ignition switch 8 as a driving start-up means, and an alarm clock 46 as a periodic start-up means, are connected to the microcomputer 41, the drive signal output circuit 42, the electrical supply circuit 43, and the regulator 45.

The ignition switch 8 is turned on or off according to an operation of a key-switch installed in the vehicle. The ignition switch 8, when turned on, outputs a start-up command signal, commanding boot-up of the ISU 40, to the above-described microcomputer 41, the electrical supply circuit 43, and the regulator 45.

The alarm clock 46, during a period when the vehicle 1 is stopped, outputs a start-up command signal commanding boot-up of the ISU 40 periodically, according to the built-in timer, to the above-described microcomputer 41, the electrical supply circuit 43, and the regulator 45.

The regulator 45 starts up triggered from an input of a start-up command signal from the ignition switch 8 or the alarm clock 46, converts output from the battery 3 to a voltage of a prescribed value, and supplies the converted output to the microcomputer 41 and the electrical supply circuit 43.

The microcomputer 41 includes a scavenging execution determination unit 411 as a scavenging execution determination means, a relay drive signal output unit 412, and a stop control unit 413.

The scavenging execution determination unit 411, in a case of start-up by the alarm clock 46, based on a temperature of the fuel cell 10 detected by the temperature sensor 19, determines whether or not to carry out scavenging of the fuel cell 10. Specifically, the scavenging execution determination unit 411 decides to carry out scavenging in a case in which a temperature detected by the temperature sensor 19 is below a prescribed threshold value, and decides not to carry out scavenging in a case in which the temperature is at least the prescribed threshold value.

The relay drive signal output unit 412, in a case of being started up by the ignition switch 8, and in a case in which the scavenging execution determination unit 411 determines that scavenging is to be carried out, outputs relay drive signals for driving the relay unit 36 to the electrical supply circuit 43.

The stop control unit 413, in response to the ignition switch 8 being turned off, carries out prescribed stop control processing for stopping the vehicle 1.

The microcomputer 41 configured as above, boots up triggered by the supply of electricity from the battery 3 via the regulator 45, and after completion of the boot-up, begins start-up of the above-described scavenging execution determination unit 411, the relay drive signal output unit 412 and the stop control unit 413.

The drive signal output circuit 42 outputs relay drive signals for driving the relay unit 36 to the electrical supply circuit 43.

The electrical supply circuit 43 is configured to include a start-up trigger determination circuit 47 to determine a start-up trigger, and a relay output switching circuit 48 that selectively switches an output of a relay drive signal between the microcomputer 41 and the drive signal output circuit 42.

The start-up trigger determination circuit 47 determines whether the start-up trigger is the ignition switch 8 or the alarm clock 46, and according to this determination, outputs a switching signal for switching an output of the relay drive signal to the relay output switching circuit 48.

The relay output switching circuit 48, depending on the input of the switching signal, by connecting the microcomputer 41 and the relay unit 36, or by connecting the drive signal output circuit 42 and the relay unit 36, selectively switches output of the relay drive signal between the microcomputer 41 and the drive signal output circuit 42. Thus, it is possible to drive the relay unit 36 by the relay drive signal outputted from the microcomputer 41, or to drive the relay unit 36 by the relay drive signal outputted from the drive signal output circuit 42.

Further, in a case in which the alarm clock 46 is the start-up trigger, the start-up trigger determination circuit 47 outputs a switch signal that selects the microcomputer 41 for output of the relay drive signal. The relay output switch circuit 48, according to an input of the switch signal, connects the microcomputer 41 and the relay unit 36. Thus, based on output of the relay drive signal from the microcomputer 41, it is possible to drive the relay unit 36.

In the ISU 40 configured as above, the electrical supply circuit 43 is constituted by, e.g., a logic circuit, and when supply of electricity from the regulator 45 begins, is immediately available for operation. In other words, the electrical supply circuit 43 operates without waiting for completion of boot-up of the microcomputer 41.

In other words, immediately after boot-up by the ignition switch 8 or the alarm clock 46, during the period in which the microcomputer 41 is being booted up, the ISU 40, based on output of the relay drive signal from the drive signal output circuit 42 side, carries out opening-closing control (hereinafter referred to as "logic control") of the relay unit 36. Further, after boot-up of the microcomputer 41 has been completed, the ISU 40, based on output of relay drive signals from the microcomputer 41 side, carries out opening-closing control (hereinafter referred to as "microcomputer control") of the relay unit 36.

Next, the procedure for starting-up the vehicle by the ISU 40 is described.

Figure 3:
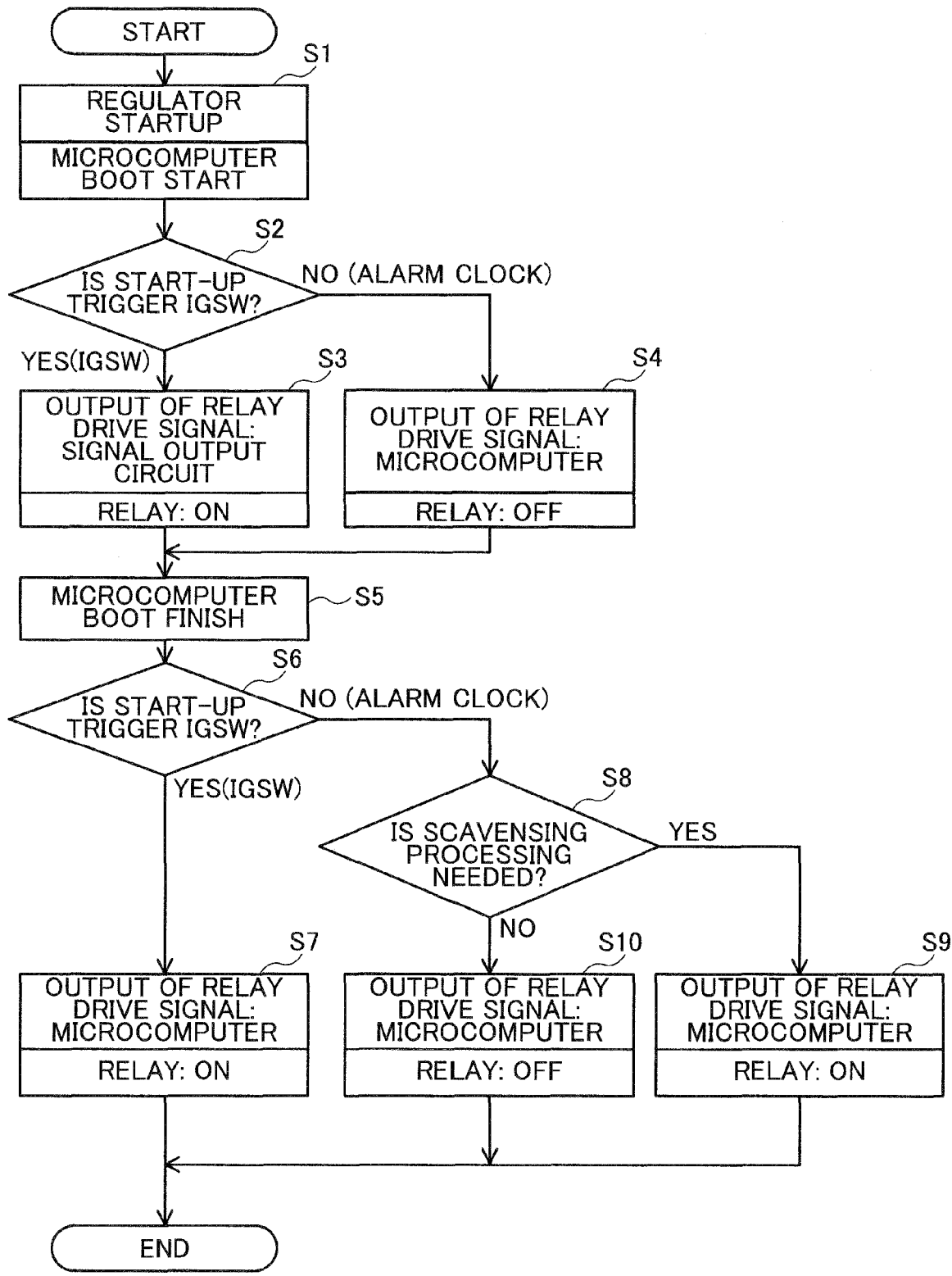
FIG. 3 is a flowchart illustrating a procedure for starting up a vehicle by an ISU related to the embodiment.

FIG. 3 is a flowchart illustrating start-up processing of a vehicle by the ISU 40. Specifically, FIG. 3 is a flowchart illustrating a procedure from when boot-up of the ISU 40 by the ignition switch 8 or the alarm clock 46 is begun, logic control (Steps S1 to S4) is carried out, until when microcomputer control (Steps S5 to S10) is then completed.

This processing begins in response to turning on of the ignition switch 8 or the alarm clock 46, and a start-up command signal being output.

In Step S1, based on an output of a start-up command signal, the regulator 45 operates. In response to operation of the regulator 45, boot-up of the microcomputer 41 begins, and logic control of the relay unit 36 begins.

In Step S2, whether the start-up trigger is the ignition switch 8 or not is determined by the start-up trigger determination circuit 47. In a case in which this determination is YES, the control flow proceeds to Step S3, and in a case in which it is NO, i.e., in a case in which the start-up trigger is the alarm clock 46, it proceeds to Step S4.

In Step S3, the relay output switching circuit 48 switches output of the relay drive signal to the drive signal output circuit 42, the drive signal output circuit 42 outputs a relay drive signal turning on the relay unit 36, and then the control flow proceeds to Step S5.

In step S4, the relay output switching circuit 48 switches output of the relay drive signal to the microcomputer 41, and the control flow proceeds to Step S5. Here, the microcomputer 41 has not yet completed booting up, so the relay drive signal has not yet been input into the relay unit 36; thus, the relay unit 36 maintains the state of being off.

In Step S5, in response to the completion of booting up of the microcomputer 41, microcomputer control of the relay unit 36 begins. In Step S6, whether the start-up trigger is the ignition switch 8 or not is determined by the microcomputer 41. In a case in which this determination is YES, the control flow proceeds to Step S7, and in a case in which it is NO, i.e., in a case in which the start-up trigger is the alarm clock 46, it proceeds to Step S8.

In Step S7, the relay output switching circuit 48 switches output of the relay drive signal to the microcomputer 41, and simultaneously, the microcomputer 41 outputs the relay drive signal, thereby turning on the relay unit 36, and the start-up processing of the vehicle finishes.

In Step S8, the microcomputer 41, upon having been booted by the alarm clock 46, determines whether or not to carry out scavenging processing of the fuel cell 10. Specifically, based on the temperature of the fuel cell 10 detected by the temperature sensor 19, whether or not scavenging processing of the fuel cell 10 is needed is determined by the scavenging execution determination unit 411 of the microcomputer 41. In a case in which this determination is YES, the control flow proceeds to Step S9, and in a case in which it is NO, it proceeds to Step S10.

In Step S9, the relay output switching circuit 48 switches output of the relay drive signal to the microcomputer 41, and simultaneously, the microcomputer 41 outputs the relay drive signal, thereby turning on the relay unit 36, and the start-up processing of the vehicle finishes. Here, in response to the relay unit 36 turning on, the ECU 30 is booted up, and after the ECU 30 has finished booting up, scavenging processing of the fuel cell 10 is carried out.

In Step S10, the relay output switching circuit 48 switches output of the relay drive signal to the microcomputer 41, and the start-up processing of the vehicle is completed. Further, in Step S10, by a determination of the scavenging execution determination unit 411 of the microcomputer 41 that scavenging of the fuel cell 10 is not needed, the microcomputer 41 leaves the relay unit 36 off, and does not carry out booting up of the ECU 30.

Next, a procedure for stopping a vehicle by the ISU 40 is described.

Figure 4:
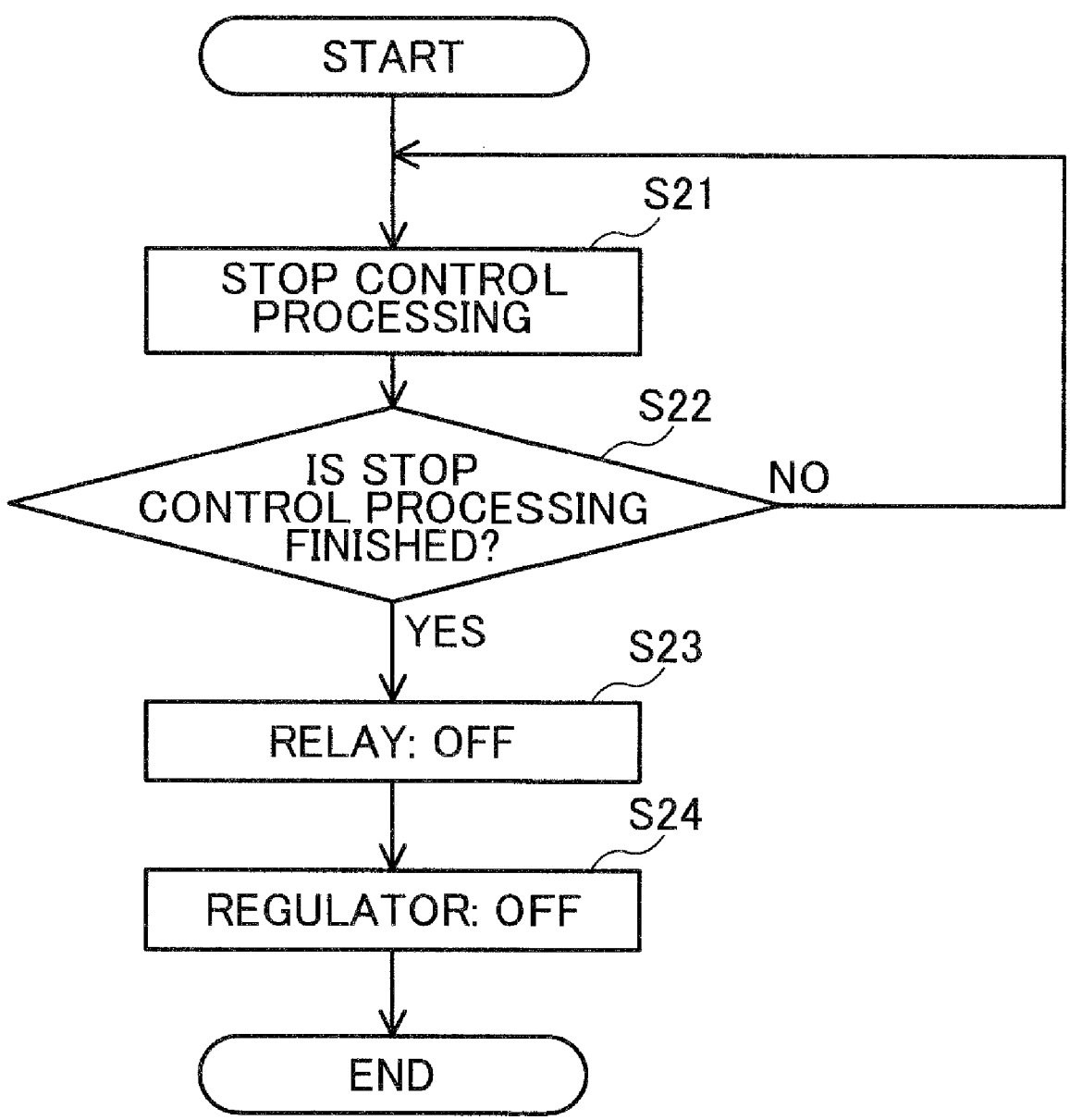
FIG. 4 is a flowchart illustrating a procedure for stopping a vehicle by the ISU related to the embodiment.

FIG. 4 is a flowchart illustrating stop-processing of a vehicle by the ISU 40. This processing begins in response to the ignition switch 8 being turned off.

In Step S21, the microcomputer 41 carries out stop control processing, and the control flow proceeds to Step S22. In Step S22, the microcomputer 41 determines whether or not stop control processing has been completed. In a case in which this determination is YES, the control flow proceeds to Step S23, and in a case in which it is NO, it proceeds to Step S21.

In Step S23, the microcomputer 41 stops output of the relay drive signal, thereby turning off the relay unit 36. Thus, supply of electricity to the ECU 30 is stopped. In Step S24, the microcomputer 41 turns off the regulator 45, and then stop-processing of the vehicle is completed.

According to the present embodiment, the following effects are achieved.

(1) During a period in which the vehicle 1 is stopped, by the alarm clock 46, the ISU 40 is periodically booted up. Then, after booting of the ISU 40 has completed, whether or not to carry out scavenging is determined by the scavenging execution determination unit 411 of the microcomputer 41 of the ISU 40 based on the temperature of the fuel cell 10.

Here, in a case in which scavenging is determined to be carried out by the scavenging execution determination unit 411, electricity is supplied to the relay unit 36, whereby the ECU 30 and the battery 3 are connected. Then, electricity is supplied to the ECU 30, and scavenging of the fuel cell 10 is carried out by the compressor control unit 32 installed on this ECU 30.

On the other hand, in a case in which scavenging is determined not to be carried out by the scavenging execution determination unit 411, electricity is not supplied to the relay unit 36. Thus, electricity is not supplied to the ECU 30.

Therefore, according to the fuel cell vehicle 1 of the present embodiment, during a period in which the vehicle 1 is stopped, because electricity is supplied to the ECU 30 only in a case in which scavenging is to be carried out, compared to a case in which electricity is supplied to the ECU 30 at each periodic boot-up, it is possible to reduce power consumption during a time of stopping of the vehicle.

(2) When the key-switch is operated, by the ignition switch 8, boot-up of the ISU 40 is begun. Meanwhile, the electrical supply circuit 43 of the ISU 40, in a case of being booted up by the ignition switch 8, supplies electricity to the relay unit 36 without waiting for completion of booting of the ISU 40, thereby connecting the battery 3 and the ECU 30. Then, electricity is supplied to the ECU 30, and usage of electrical equipment controlled by the ECU 30 becomes possible.

Therefore, in a case in which the ISU 40 is booted up by the ignition switch 8, compared to a case in which the ISU 40 is booted up by the alarm clock 46, it is possible to shorten the start-up time of the vehicle 1 by the amount of time not waiting for the completion of the boot-up of the microcomputer 41 and the like of the ISU 40.

(3) In response to the turning on of the ignition switch 8, the microcomputer 41 of the ISU 40 sends a signal, stopping supply of electricity to the relay unit 36 from the electrical supply circuit 43, and after stopping supply of electricity to the ECU 30, stops supply of electricity from the regulator 45. Thus, during carrying out of stop-processing of electrical equipment by, e.g., the ECU 30 for the motor 4, the air compressor 6, and the like, by stopping supply of electricity to the electrical supply circuit 43, it is possible to prevent breakdown of the ECU 30 or electrical equipment.

Moreover, the present invention is not limited to the above-mentioned embodiment, but modifications in form, improvements, and the like within the scope of achieving the objective of the present invention are included within the present invention.

For example, in the present embodiment, the battery 3 is used as an electrical storage device; however, not only a battery, but a capacitor, may be used as well.

Further, in the present embodiment, a temperature sensor 19 for detecting a temperature of the fuel cell 10 was installed, and based on a temperature detected by the temperature sensor 19, whether or not to carry out scavenging processing of the fuel cell 10 was determined; however, the configuration need not be limited to this. For example, it is possible to detect a water temperature and the like of coolant water discharged from a fuel cell, and to make a determination of scavenging based on the temperature.

What is claimed is:

1. A fuel cell vehicle, comprising:
a fuel cell;
a plurality of electrical equipment, having at least an air compressor;
an electrical storage device for storing electricity generated by the fuel cell;
a low-level control device for controlling the plurality of electrical equipment;
a relay unit that is provided in an electrical supply line connecting the low-level control device and the electrical storage device, and is driven based on a relay drive signal;
a fuel cell temperature detection means for detecting a temperature of the fuel cell;
a scavenging means, provided to the low-level control device, for driving the air compressor, and scavenging an interior of the fuel cell;
a high-level control device, operating by electricity supplied from the electrical storage device, and having a microcomputer that determines, based on a temperature of a fuel cell detected at the fuel cell temperature detection means, whether or not to carry out scavenging by the scavenging means and that performs output of a drive signal based on the determination, and a drive signal output circuit that outputs a relay drive signal separately from the microcomputer;
a periodic start-up means for periodically booting up the high-level control device during a period when the vehicle is stopped;
a driving start-up means for initiating booting of the high-level control device when a key-switch installed in the vehicle is operated; and
an electrical supply circuit including a start-up trigger determination circuit that determines whether a start-up trigger is the periodic start-up means or the driving start-up means, and a relay output switching circuit that selectively switches output of the relay drive signal between the microcomputer and the drive signal output circuit, wherein:
the low-level control device and the high-level control device are configured to be separate, and
the electrical supply circuit, at a time of startup by way of the periodic start-up means, waits for boot-up completion of the microcomputer, and in a case in which the microcomputer has determined to perform scavenging, a relay drive signal is output from the microcomputer and the relay unit is driven, and in a case in which the microcomputer determines not to perform scavenging, the relay drive signal is not input to the relay unit, and at a time of startup by way of the driving start-up means, does not wait for boot-up completion of the microcomputer, a relay drive signal is output from the drive signal output circuit, and after boot-up of the microcomputer has been completed, carries out opening-closing control of the relay unit based on a relay drive signal from the microcomputer.

* * * * *